United States Patent
Yoshimoto

(10) Patent No.: US 7,483,347 B2
(45) Date of Patent: Jan. 27, 2009

(54) OPTICAL DISK APPARATUS

(75) Inventor: Tadafumi Yoshimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 699 days.

(21) Appl. No.: 11/211,470

(22) Filed: Aug. 26, 2005

(65) Prior Publication Data

US 2006/0062123 A1 Mar. 23, 2006

(30) Foreign Application Priority Data

Aug. 30, 2004 (JP) ............... 2004-250688

(51) Int. Cl.
*G11B 7/00* (2006.01)
(52) U.S. Cl. .............. 369/44.32; 369/53.14; 369/53.19
(58) Field of Classification Search .............. 369/53.12, 369/53.14, 53.1, 53.3, 44.32, 53.41, 53.43, 369/53.42, 53.19
See application file for complete search history.

(56) References Cited

U.S. PATENT DOCUMENTS 6,041,030 A * 3/2000 Ohmi ................... 369/53.19

* cited by examiner

*Primary Examiner*—Nabil Z Hindi
(74) *Attorney, Agent, or Firm*—Morgan, Lewis & Bockius LLP

(57) ABSTRACT

An optical disk apparatus detects a predetermined tilt angle and a predetermined focus bias at least two detection points on an inner and an outer circumferences of the optical disk. On the basis of the predetermined tilt angle detected at the detection points, the apparatus estimates the predetermined tilt angle at a radial position of the optical disk, and also estimates a focus bias. The apparatus controls the tilt angle according to a radial position of target track and a focus bias on the basis of estimation results at the time of recording and reading data on the optical disk.

6 Claims, 4 Drawing Sheets

OPTICAL DISK APPARATUS

BACKGROUND OF THE INVENTION

1. Field of the Invention

The present invention relates to an optical disk apparatus for reading data recorded on optical disks such as CDs and DVDs and recording data on the optical disks.

2. Description of the Related Art

An optical disk apparatus have so far found a wide application in reading the data recorded on optical disks such as CDs and DVDs and recording the data on the optical disks. The optical disk apparatus radiates a laser beam to an optical disk set on the main body to read recorded data or record the data. The optical disk apparatus conduct a focus control in which a focusing position of a laser beam radiating to an optical disk is adjusted to a recording plane of the optical disk at the time of reading or recording data, and a tracking control in which a position of radiating a laser beam is adjusted to the center of the track of the optical disk. The focus control is a control in which an objective lens arrayed between the optical disk and LD (light source) is moved toward the direction of contacting on and off an optical disk. Further, the tracking control is a control in which the objective lens and the main body of a pickup head are moved radially toward the optical disk. The pickup head is provided with an LD, an objective lens and a biaxial actuator which allows the objective lens to move in the direction of contacting on and off the optical disk and radially toward the optical disk. Further, the pickup head is attached radially toward the optical disk in a freely movable way. A thread motor allows the pickup head to move radially toward the optical disk. The focus control is conducted in accordance with a focus error signal (hereinafter referred to as FE signal) which indicates a deviation extent from a focusing position of a laser beam giving radiation to the recording plane of the optical disk, and the tracking control is conducted in accordance with a tracking error signal (hereinafter referred to as TE signal) which indicates a deviation extent of the center of the track of the optical disk from the position of radiating a laser beam.

In addition, since DVDs record data at a higher density than CDs, the track pitch and the pit size of DVDs are smaller than those of CDs. BDs (Blu-ray disk) are now under development, which can record data at a higher density than DVDs. In order to record or reproduce data on optical disks such as DVDs and BDs at a higher density, it is necessary to accurately control a spot diameter of a laser beam focusing light on the recording plane of the optical disk. Unless an optical axis of a laser beam radiating from the pickup head is vertical to the recording plane of the optical disk, coma aberration will occur in the laser beam concentrated on the recording plane of the optical disk. Therefore, in order to control more accurately the spot diameter of a laser beam concentrated on the recording plane of the optical disk, it is necessary to control the optical axis of the laser beam radiating from the pickup head vertical in relation to the recording plane of the optical disk. On the other hand, since the optical disk has a certain warp, provided is a mechanism for controlling an angle (tilt angle) for tilting the pickup head or the objective lens according to the warp of the optical disk (hereinafter referred to as tilt control mechanism). An optical disk apparatus equipped with a tilt control mechanism for tilting a pickup head has been disclosed in JP-A-2001-195763 and JP-A-5-63332, for example. Further, an optical disk apparatus equipped with a tilt control mechanism for tilting an objective lens has been disclosed in JP-A-2004-118909, for example.

SUMMARY OF THE INVENTION

However, a distance between the objective lens and the recording plane of the optical disk varies according to the change in tilt angle by the tilt control. Therefore, an appropriate focus bias used in focus control also varies. In conventional optical disk apparatus, the focus bias used in focus control is not controlled by the tilt control according to the tilt angle at which the pickup head or the objective lens is tilted. In focus control, as publicly known, signals generated on the basis of the FE signal are input to the focus bias, and superimposed focus servo signals are input to an actuator of the pickup head. Therefore, unless the focus bias is properly controlled, it is impossible to attain a proper focus control. In other words, conventional optical disk apparatus have problems wherein control defects of focus bias may easily result in a failure of reading or recording data on an optical disk.

It is an object of the present invention to provide an optical disk apparatus which has been improved in the accuracy of reading data on an optical disk by controlling the tilt angle in conjunction with the focus bias.

According to one aspect of the invention, there is provided an optical disk apparatus including: a reading unit for radiating a laser beam via an objective lens to an optical disk set in a main body to read data recorded on the optical disk; a tilt angle control unit for controlling a tilt angle of the reading unit in relation to the optical disk; a focus control unit for executing a focus control by which the objective lens is moved to a direction of contacting on and off the optical disk on the basis of a focus error signal indicating a deviation extent of a focusing position of the laser beam from a recording plane of the optical disk; and a focus bias control unit for controlling a focus bias which is used for the focus control by the focus control unit; a detection unit for detecting a tilt angle of the reading unit in relation to the optical disk by referring to two detection points on an inner circumference of the optical disk and an outer circumference of the optical disk, the detection unit detecting a focus bias by the detected tilt angle, a tilt angle estimating unit for estimating a tilt angle of the reading unit at a radial position of the optical disk by referring to a linear approximation of the tilt angle detected at the two detection points by the detection unit; a focus bias estimating unit for estimating a focus bias at a radial position of the optical disk by referring to a linear approximation of the focus bias detected at the two detection points by the detection unit, wherein the tilt angle control unit controls a tilt angle of the reading unit at a radial position of the optical disk on the basis of the tilt angle of the reading unit at the radial position of the optical disk estimated by the tilt angle estimating unit at the time of reading data recorded on the optical disk, wherein the focus bias control unit controls a focus bias on the basis of the focus bias at the radial position of the optical disk estimated by the focus bias estimating unit at the time of reading the data recorded on the optical disk. The detection unit detects, as the tilt angle, a tilt angle which is obtained when the tilt angle of the reading unit is allowed to change at each detection point in relation to the optical disk, thereby attaining a greatest value in amplitude of reading signal of the data recorded on the optical disk of the reading unit. The detection unit detects, as the focus bias, a focus bias which is obtained when the focus bias of the reading unit is allowed to change in relation to the optical disk, thereby attaining the greatest value in amplitude of reading signals of the data recorded on the optical disk of the reading unit.

In this construction, the detection unit detects an appropriate tilt angle by referring to a plurality of detection points in the radial direction of the optical disk and also detects an appropriate focus bias by referring to the tilt angle. For example, when the tilt angle is allowed to change in a predetermined range, thereby attaining the greatest value in amplitude of the RF signal, it is detected as an appropriate tilt angle. Further, when the focus bias is allowed to change in a predetermined range, thereby attaining the greatest value in amplitude of the RF signal, it is detected as an appropriate focus bias. The tilt angle estimating unit estimates an appropriate tilt angle at the radial position of the optical disk on the basis of the appropriate tilt angle detected at a plurality of detection points. Further, the focus bias estimating unit estimates an appropriate focus bias at the radial position of the optical disk on the basis of the appropriate focus bias detected at a plurality of detection points. An appropriate tilt angle at the radial position of the optical disk may be obtained, for example, by estimating a tilt angle between two detection points on the basis of a primary approximation (linear approximation) of the appropriate tilt angle between two detection points radially adjacent to the optical disk. In a similar way, an appropriate focus bias at the radial position of the optical disk may be obtained, for example, by estimating a focus bias between two detection points on the basis of a primary approximation (linear approximation) of the appropriate focus bias between two detection points radially adjacent to the optical disk. A tilt angle is controlled on the basis of the tilt angle at the radial position of the optical disk estimated by the tilt angle control unit, and a focus bias is controlled on the basis of the focus bias at the radial position of the optical disk estimated by the focus bias control unit.

Therefore, the above construction makes it possible to control the tilt angle in conjunction with the focus bias, preventing a possible failure in reading data on an optical disk due to control defects of the focus bias and also improving the accuracy of reading data from the optical disk.

An optical disk apparatus having a recording unit for recording data on an optical disk can control the tilt angle in conjunction with the focus bias, as with the above reading process, at the time of recording data, thereby improving the accuracy of recoding data on the optical disk.

According another aspect of the invention, the detection unit detects a tilt angle and a focus bias of the reading unit in relation to the optical disk at two detection points on an inner circumference of the optical disk and an outer circumference of the optical disk.

The above construction in which two detection points are available on the inner and the outer circumferences makes it possible to reduce the time necessary for estimating the tilt angle and the focus bias at the radial position of the optical disk and also prevent a reduction in operability.

According to the above-aspects of the invention, the tilt angle can be controlled in conjunction with the focus bias. a possible failure can be prevented in reading data on an optical disk due to control defects of the focus bias. The accuracy of reading data from the optical disk can be improved.

According to the above-aspects of the invention, the time necessary for estimating the tilt angle and the focus bias at the radial position of the optical disk can be reduced. a reduction in operability can be prevented.

DESCRIPTION OF THE PREFERRED EMBODIMENTS

Hereinafter, an explanation will be made for an optical disk apparatus, which is an embodiment.

Figure 1:
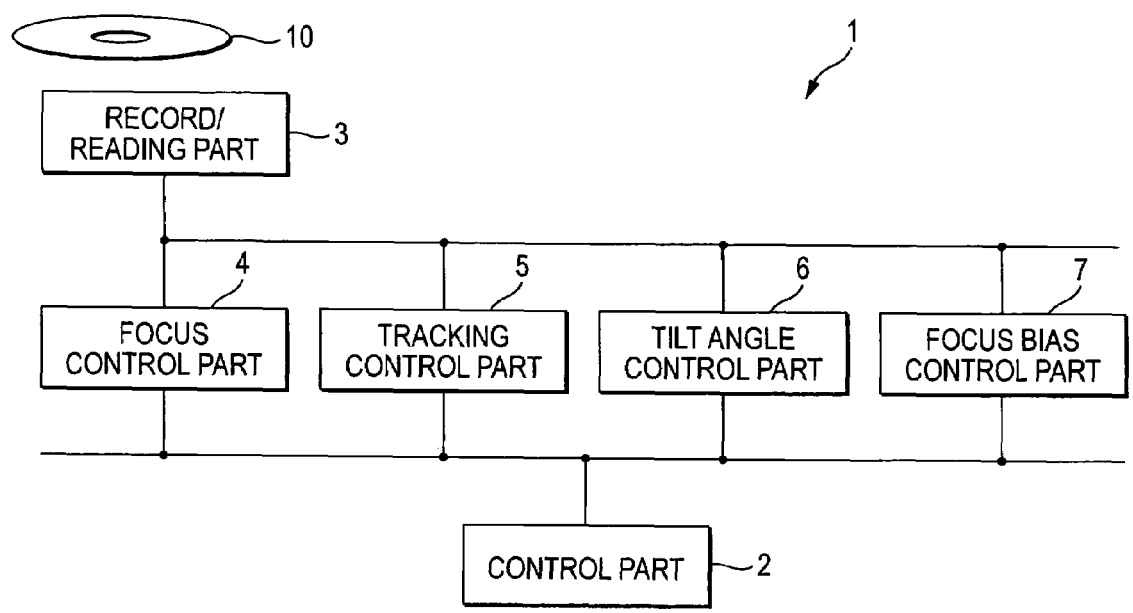
FIG. 1 is a block diagram showing the construction of major parts of the optical disk apparatus in an embodiment.

FIG. 1 is a block diagram showing the construction of major parts of an optical disk apparatus according to the embodiment. The optical disk apparatus 1 is provided with a control part 2 for controlling movements of a main body, a recording/reading part 3 for radiating a laser beam to optical disks 10 such as CDs and DVDs set on the main body to read recorded data and record data, a focus control part 4 for focusing a laser beam to the recording plane of the optical disk 10 to attain a focus control, a tracking control part 5 for adjusting a laser beam to the center of the track of the optical disk 10 (tracking control), a tilt angle control part 6 for controlling the tilt angle of the recording/reading part 3 and a focus bias control part 7 for controlling the focus bias.

Figure 2A:
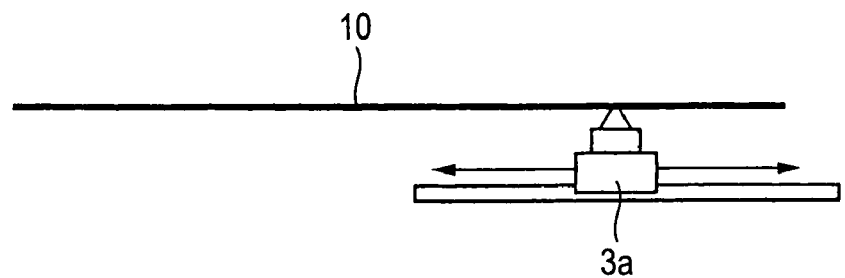
FIG. 2 is a drawing showing the pickup head of the optical disk apparatus in the embodiment.
Figure 2B:
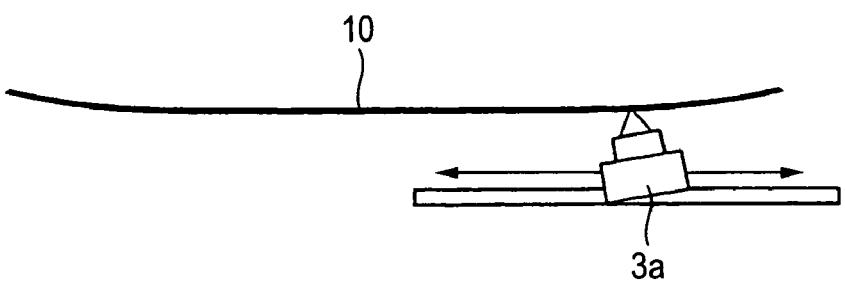
Figure 2C:
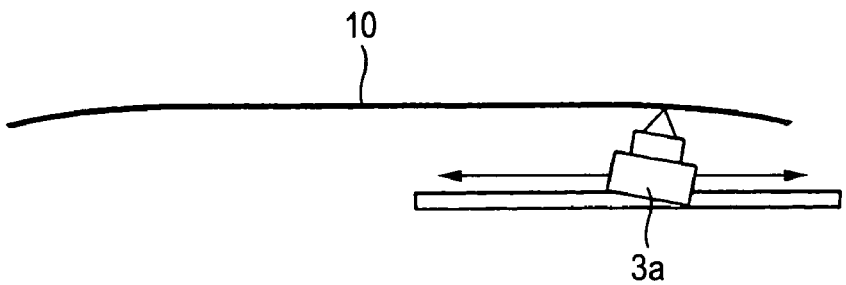

The recording/reading part 3 has a pickup head 3a. As shown in FIG. 2, the pickup head 3a is fixed on an axis extending radially to an optical disk 10 and moved along the axis by a thread motor (not illustrated). Further, the pickup head 3a is fixed on the recording plane of the optical disk 10 in a freely rocking way. The pickup head 3a is rocked to control the tilt, by which the optical axis of a laser beam radiated from the pickup head 3a can be made vertical to the recording plane of the optical disk 10, even if the optical disk 10 is warped. FIG. 2A shows a state that the optical disk 10 is not warped, and FIGS. 2B and 2C are figures showing that the optical disk 10 is warped. The pickup head 3a is provided with a light source element of an laser diode (hereinafter referred to as "LD") emitting laser beam to an optical disk 10, an objective lens for collecting a laser beam emitted from LD, a biaxial actuator for moving the objective lens toward the direction of contacting on and off the optical disk 10 and the radial direction of the optical disk 10 and a light receiving element of an FD for detecting reflected light from the optical disk 10.

A focus control part 4 moves the objective lens of the pickup head 3a toward the direction of contacting on and off the optical disk 10 on the basis of an FE signal output from the pickup head 3a. The focus control part 4 inputs to the pickup head 3a (an actuator which moves the objective lens to the direction of contacting on and off the optical disk 10) a focus servo signal in which a focus bias to be explained later is superimposed on the signal according to the FE signal. A tracking control part 5 moves the objective lens of the pickup head 3a or the pickup head 3a toward the radial direction of the optical disk 10 on the basis of the TE signal output from the pickup head 3a.

Figure 3:
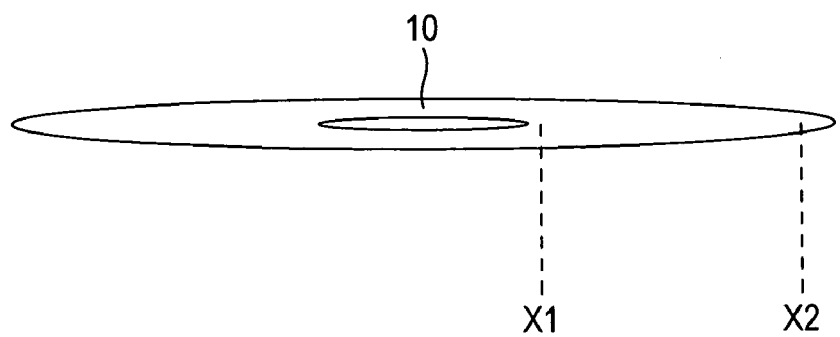
FIG. 3 is a drawing explaining detection points for detecting the tilt angle and the focus bias.

A tilt angle control part 6 estimates an appropriate tilt angle at the radial position of the optical disk 10 by using an appropriate tilt angle (gradient of the pickup head 3a) of the pickup head 3a detected at two detection points X1 and X2 set on the inner and outer circumference of the disk 10 as shown in FIG. 3. To be more specific, an appropriate tilt angle at the radial position of the optical disk 10 is estimated with reference to a primary approximation obtained by using an appropriate tilt angle at these two detection points X1 and X2. Where an appropriate tilt angle at the detection point X1 on the inner circumference is A1 and an appropriate tilt angle at the detection point X2 on the outer circumference is A2, an appropriate tilt angle α at a point where the radial position of the optical disk 10 is X is estimated to be $$\alpha(X)=(X-X1)\times(A2-A1)/(X2-X1)+A1$$

$$(\text{or } \alpha=(X-X2)\times(A2-A1)/(X2-X1)+A2).$$

The radial position of the optical disk 10 may be a distance from the center or an address. The tilt angle control part 6 rocks the pickup head 3a at the time of reading or recording data on the optical disk 10 to control the tilt angle of the pickup head 3a on the basis of the tilt angle at the radial position of the estimated optical disk 10.

Further, an appropriate tilt angle at the detection points X1 and X2 is a gradient of the pickup head 3a obtained when the tilt angle of the pickup head 3a is allowed to undergo a stepwise change in a predetermined range, thereby attaining the greatest value in amplitude of the RF signal.

A focus bias control part 7 detects an appropriate focus bias of the pickup head 3a at two detection points X1 and X2 set on the inner and the outer circumferences of the disk 10 shown in FIG. 3 and estimates an appropriate focus bias at the radial position of the optical disk 10 with reference to a primary approximation obtained by using an appropriate focus bias at these two detection points. To be more specific, where an appropriate focus bias at the detection point X1 on the inner circumference is B1 and an appropriate focus bias at the detection point X2 on the outer circumference is B2, an appropriate focus bias β at a point in which the radial position of the optical disk 10 is X is estimated to be $$\beta(X)=(X-X1)\times(B2-B1)/(X2-X1)+B1$$

$$(\text{or } \beta=(X-X2)\times(B2-B1)/(X2-X1)+B2).$$

The radial of the optical disk 10 may be a distance from the center or an address. The focus bias control part 6 controls the focus bias which is input to the focus control part 4 at the time of reading or recording data on the optical disk 10 on the basis of the focus bias at the radial position of the optical disk 10. Further, an appropriate focus bias at the detection points X1 and X2 is a focus bias obtained when the focus bias is allowed to undergo a stepwise change in the predetermined range, thereby attaining the greatest value in amplitude of the RF signal, in a state that the pickup head 3a is tilted to an appropriate tilt angle which has been detected at the detection points X1 and X2.

Figure 4:
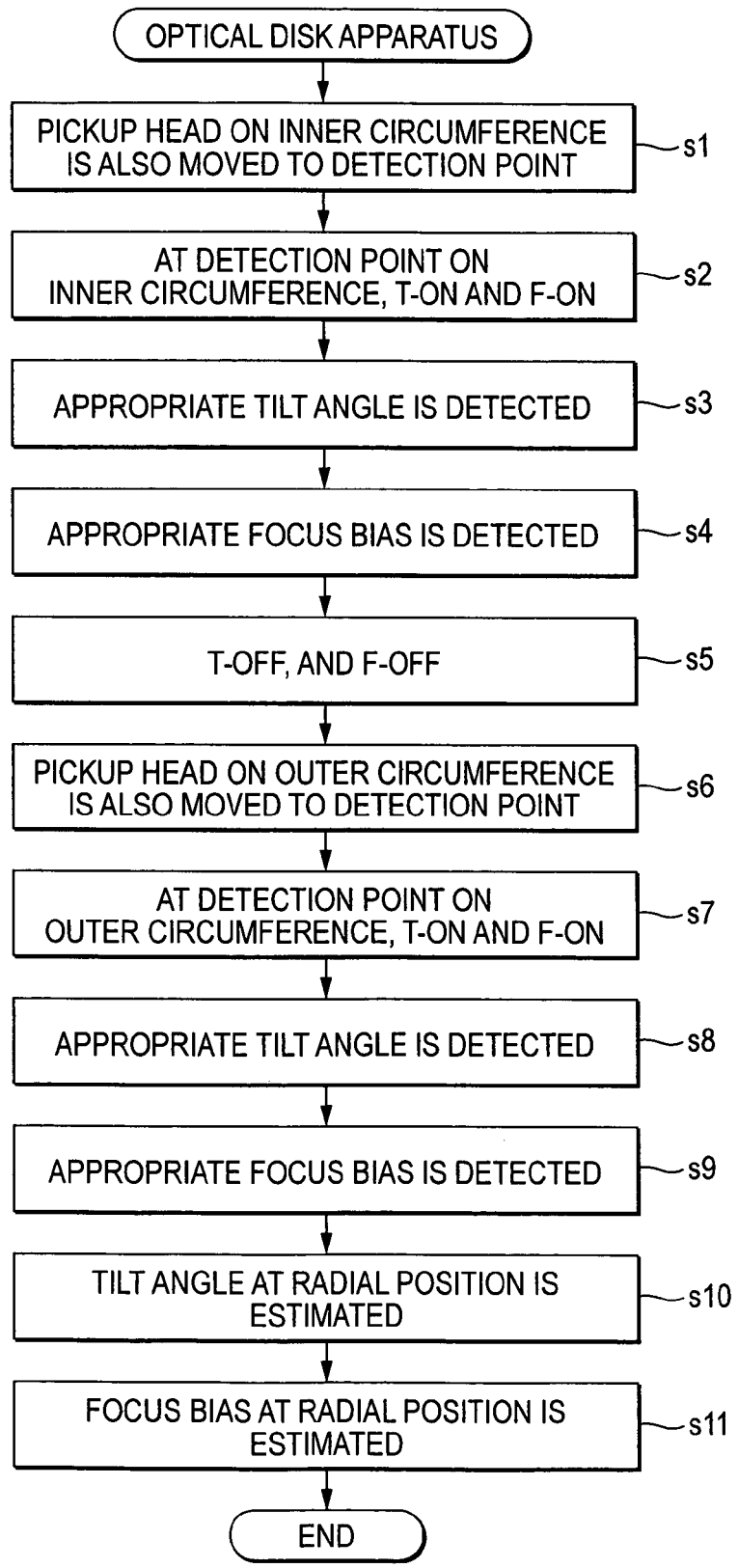
FIG. 4 is a flow chart showing motions of the optical disk apparatus in the embodiment.

Hereinafter, an explanation is made for motions of the optical disk apparatus 1 according to the embodiment. FIG. 4 is a drawing showing a process of estimating an appropriate tilt angle and an appropriate focus bias at the radial position of the optical disk on the optical disk apparatus of the embodiment. The process is conducted when the power switch is on and the optical disk 10 is set and/or when the optical disk 10 is set. The optical disk apparatus 1 moves the pickup head 3a to the detection point X1 on the inner circumference of the optical disk 10 (s1). Then, the tracking servo is switched on by the servo tracking control part 5 and the focus servo is on by the focus control part 4 (s2). The optical disk apparatus 1 detects an appropriate tilt angle A1 at the detection point X1 on the inner circumference in the tilt angle control part 6 (s3). In the s3, the pickup head 3a is tilted in a stepwise fashion in a predetermined range, thereby detecting a gradient of the pickup head 3a as an appropriate tilt angle A1 at the detection point X1 when the RF signal is the greatest.

When detecting an appropriate tilt angle A1 at the detection point X1, the optical disk apparatus 1 detects an appropriate focus bias B1 at the detection point X1 in the focus control part 7 (s4). In the s4, a focus bias obtained when the gradient of the pickup head 3a is given as a tilt angle detected by the s3 and the focus bias is allowed to undergo a stepwise change in a predetermined range, thereby attaining the greatest value of an RF signal detected as an appropriate focus bias B1 at the detection point X1.

When detecting an appropriate tilt angle A1 and an appropriate focus bias B1 at the detection point X1 on the inner circumference, the optical disk apparatus 1 switches off the tracking servo by the tracking control part 5 and the tracking servo by the focus control part 4 (s5), thereby moving the pickup head 3a to the detection point X2 on the outer circumference of the optical disk 10 (s6). Then, the tracking servo is switched on by the tracking control part 5 and the focus servo is also switched on by the focus control 4 (s7). The optical disk apparatus 1 detects an appropriate tilt angle A2 at the detection point X2 on the outer circumference in the tilt angle control part 6 (s8). In the s8, as with the s3, a gradient of the pickup head 3a obtained when the pickup head 3a is tilted in a stepwise fashion in a predetermined range, thereby attaining the greatest value of an RF signal detected as an appropriate tilt angle A2 at the detection point X2.

When detecting an appropriate tilt angle A2 at the detection point X2, the optical disk apparatus 1 detects an appropriate focus bias B2 at the detection point X2 in the focus bias control part 7 (s9). In the s9, as with the s4, a focus bias obtained when the gradient of the pickup head 3a is given as a tilt angle detected at the s3 and the focus bias is allowed to undergo a stepwise change in a predetermined range, thereby attaining the greatest of an RF signal detected as an optimal focus bias B2 at the detection point X2.

When detecting an appropriate tilt angle A2 and an appropriate focus bias B2 at the detection point X2 on the outer circumference, the optical disk apparatus 1 estimates an appropriate tilt angle at the radial position of the optical disk 10 in the tilt angle control part 6 (s10). In the s10, an appropriate tilt angle at the radial position of the optical disk 10 is estimated with reference to a primary approximation obtained by using appropriate tilt angles A1 and A2 at two detection points X1 and X2 on the inner and outer circumferences detected at the s3 and s8. To be more specific, an appropriate tilt angle α (X) at the radial position X of the optical disk 10 is estimated as $$\alpha(X)=(X-X1)\times(A2-A1)/(X2-X1)+A1.$$

The tilt angle control part 6 is a result of the estimation. The primary approximation formula is memorized. Further, the optical disk apparatus 1 estimates an appropriate focus bias at the radial position of the optical disk 10 in the focus bias control part 7 (s11). In the s11, an appropriate focus bias at the radial position of the optical disk 10 is estimated with a primary approximation obtained by using appropriate focus biases B1 and B2 at two detection points X1 and X2 on the inner and the outer circumferences detected at the s4 and the s9. To be more specific, an appropriate focus bias β(X) at the radial position X of the optical disk 10 is estimated as $$\beta(X)=(X-X1)\times(B2-B1)/(X2-X1)+B1.$$

The focus bias control part 6 is a result of the estimation. The primary approximation formula is memorized.

After completion of estimating an appropriate tilt angle and an appropriate focus bias at the radial position X of the optical disk 10, the optical disk apparatus 1 terminates the process. Thereafter, the optical disk apparatus 1 conducts a process of reading or recording data on the optical disk 10. At the time of reading or recording data on the optical disk, the tilt control part 6 allows the pickup head 3a to tilt toward an appropriate tilt angle estimated at the s10 according to the radial direction of a reading track or a recording track (target track). Further, the focus bias control part 7 inputs to a focus control part 4 an appropriate focus bias estimated at the s11 according to the radial direction of a reading track or a recording track (target track). The focus control part 4 conducts a focus control by using the focus bias input from the focus bias control part 7.

Therefore, the optical disk apparatus 1 is able to control the tilt angle of the pickup head 3a in conjunction with the focus bias according to the reading position or recording position of the data at the optical disk 10 at the time of reading or recording data, thereby preventing a possible failure in reading or recording data on the optical disk due to control defects of the focus bias and improving the accuracy of such reading and recording.

Further, the optical disk apparatus is constructed in such a way that an appropriate tilt angle and an appropriate focus bias at the radial position X of the optical disk are estimated from the tilt angles A1 and A2 and the focus biases B1 and B2 detected at the detection points X1 and X2 on the inner and the outer circumferences, thereby making it possible to reduce the time necessary for estimation and prevent a reduction in operability.

In the above embodiment, a tilt angle which is the greatest in amplitude of the RF signal at the detection points on the inner and the outer circumferences is detected as an appropriate tilt angle. A tilt angle which is the greatest in amplitude of the TE signal may also be detected as an appropriate tilt angle. A tilt angle of the pickup head 3a which is the greatest in amplitude of the RF signal is approximately equal to that of the pickup head 3a which is the greatest in amplitude of the TE signal. In this instance, an appropriate tilt angle is estimated in a state that the tracking control by the tracking control part 5 is switched off.

The optical disk apparatus may be constructed in such a way that a focus bias which is the greatest in amplitude of the TE signal at the detection points X1 and X2 on the inner and the outer circumferences is detected, based on which an estimation is made for a change rate of an appropriate focus bias between the inner circumference of the optical disk 10 and the outer circumference, more particularly, a value corresponding to (B2−B1)/(X2−X1) in the embodiment. In this instance, as explained in the embodiment, an appropriate focus bias is detected at either of the detection point on the inner or that on the outer circumference, thereby making it possible to estimate an appropriate focus bias at the radial position of the optical disk 10.

Since no data is recorded at the detection point X1 or X2 in a method for estimating an appropriate tilt angle and an appropriate focus bias at the radial position of the optical disk 10 by referring to amplitude of the TE signal, an appropriate estimation can be made even in an optical disk 10 where the amplitude of the RF signal is not obtained.

In the embodiment, a tilt angle or a focus bias which is the greatest in amplitude of the RF signal is detected as an appropriate tilt angle or an appropriate focus bias. A diffraction grating is used to generate a sub beam from a laser beam radiated from an LD and a tilt angle or a focus bias may be detected which is the greatest in amplitude of the reflected light of the sub beam.

Figure 5:
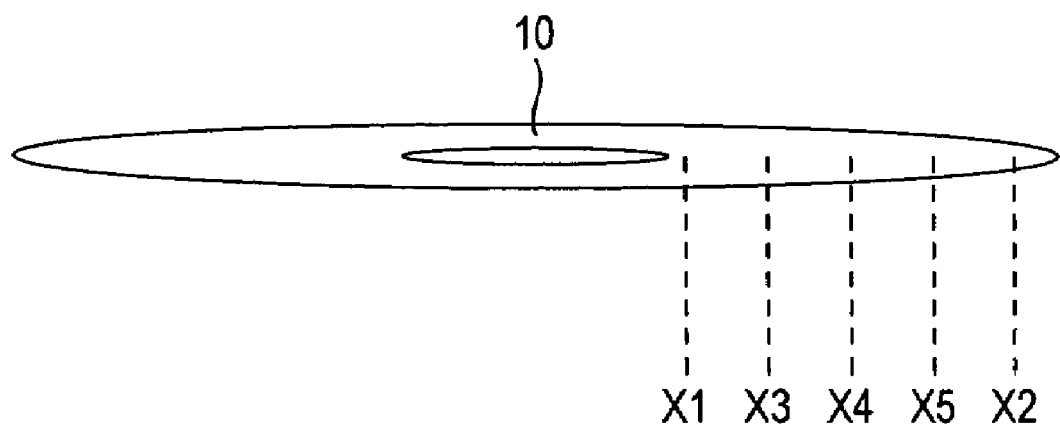
FIG. 5 is a drawing explaining detection points for detecting an appropriate tilt angle and an appropriate focus bias.

In the embodiment, an appropriate tilt angle and an appropriate focus bias are detected at two detection points on the inner and the outer circumferences. However, an appropriate tilt angle and an appropriate focus bias may be detected at three or more detection points to estimate an appropriate tilt angle and an appropriate focus bias each at two adjacent detection points by referring to a primary approximation. For example, as shown in FIG. 5, the optical disk 10 is divided into four portions radially to detect an appropriate tilt angle and an appropriate focus bias at detection points X1 through X5, and then, an appropriate tilt angle and an appropriate focus bias are respectively estimated between X1-X3, X3-X4, X4-X5 and X5-X2 by referring to the linear approximation. This makes it possible to improve an accuracy of estimating an appropriate tilt angle and an appropriate focus bias in the radial direction of the optical disk 10 and more assuredly prevent a failure in reading or recording data on the optical disk 10.

What is claimed is:

1. An optical disk apparatus comprising:
a reading unit for radiating a laser beam via an objective lens to an optical disk set in a main body to read data recorded on the optical disk;
a tilt angle control unit for controlling a tilt angle of the reading unit in relation to the optical disk;
a focus control unit for executing a focus control by which the objective lens is moved to a direction of contacting on and off the optical disk on the basis of a focus error signal indicating a deviation extent of a focusing position of the laser beam from a recording plane of the optical disk; and
a focus bias control unit for controlling a focus bias which is used for the focus control by the focus control unit;
a detection unit for detecting a tilt angle of the reading unit in relation to the optical disk by referring to two detection points on an inner circumference of the optical disk and an outer circumference of the optical disk, the detection unit detecting a focus bias by the detected tilt angle,
a tilt angle estimating unit for estimating a tilt angle of the reading unit at a radial position of the optical disk by referring to a linear approximation of the tilt angle detected at the two detection points by the detection unit;
a focus bias estimating unit for estimating a focus bias at a radial position of the optical disk by referring to a linear approximation of the focus bias detected at the two detection points by the detection unit, wherein the tilt angle control unit controls a tilt angle of the reading unit at a radial position of the optical disk on the basis of the tilt angle of the reading unit at the radial position of the optical disk estimated by the tilt angle estimating unit at the time of reading data recorded on the optical disk, wherein the focus bias control unit controls a focus bias on the basis of the focus bias at the radial position of the optical disk estimated by the focus bias estimating unit at the time of reading the data recorded on the optical disk,
wherein the detection unit detects, as the tilt angle, a tilt angle which is obtained when the tilt angle of the reading unit is allowed to change at each detection point in relation to the optical disk, thereby attaining a greatest value in amplitude of reading signal of the data recorded on the optical disk of the reading unit, and
wherein the detection unit detects, as the focus bias, a focus bias which is obtained when the focus bias of the reading unit is allowed to change in relation to the optical disk, thereby attaining the greatest value in amplitude of reading signals of the data recorded on the optical disk of the reading unit.

2. An optical disk apparatus comprising:
a reading unit for radiating a laser beam via an objective lens to an optical disk set in a main body to read data recorded on the optical disk;
a tilt angle control unit for controlling a tilt angle of the reading unit in relation to the optical disk;

a focus control unit for executing a focus control by which an objective lens is moved to a direction of contacting on and off the optical disk on the basis of a focus error signal indicating a deviation extent of a focusing position of the laser beam from a recording plane of the optical disk;

a focus bias control unit for controlling a focus bias which is used for the focus control by the focus control unit;

a detection unit for detecting a tilt angle of the reading unit in relation to the optical disk by referring to a plurality of detection points in a radial direction of the optical disk, and the focus bias unit detecting an focus bias by the detected tilt angle;

a tilt angle estimating unit for estimating a tilt angle of the reading unit in relation to a radial position of the optical disk by referring to the tilt angle detected by a plurality of detection points in the radial direction of the optical disk detected by the detection unit; and a focus bias estimating unit for estimating a focus bias in relation to the radial position of the optical disk by referring to the focus bias detected at a plurality of detection points in the radial direction of the optical disk detected by the detection unit, wherein the tilt angle control unit controls a tilt angle of the reading unit in relation to the optical disk on the basis of the appropriate tilt angle at the radial position of the optical disk estimated by the tilt angle estimating unit at the time of reading data recorded on the optical disk, and wherein the focus bias control unit controls a focus bias on the basis of the focus bias at the radial position of the optical disk estimated by the focus bias estimating unit at the time of reading the data recorded on the optical disk.

3. An optical disk apparatus according to claim 2, wherein the tilt angle estimating unit estimates an tilt angle between two detection points adjacent radially to the optical disk by referring to a linear approximation of the tilt angle detected at the two detection points, and wherein the focus bias estimating unit estimates a focus bias between the two detection points adjacent radially to the optical disk by referring to a linear approximation of the appropriate focus bias detected by the two detection points.

4. An optical disk apparatus according to claim 2, wherein the detection unit detects a tilt angle and a focus bias of the reading unit in relation to the optical disk at two detection points on an inner circumference of the optical disk and an outer circumference of the optical disk.

5. An optical disk apparatus according to claim 2, wherein the detection unit detects, as the tilt angle, a tilt angle obtained when the tilt angle of the reading unit is allowed to change at the respective detection points in relation to the optical disk, thereby attaining a greatest value in amplitude of reading signals of the data recorded on the optical disk of the reading unit.

6. An optical disk apparatus according to claim 2, wherein the detection unit detects, as the focus bias, a focus bias obtained when the focus bias of the reading unit is allowed to change in relation to the optical disk, thereby attaining a greatest value in amplitude of reading signals of the data recorded on the optical disk of the reading unit.

\* \* \* \* \*